United States Patent
Yang

(10) Patent No.: US 11,436,702 B2
(45) Date of Patent: Sep. 6, 2022

(54) SYSTEMS AND METHODS FOR SUPER-RESOLUSION IMAGE RECONSTRUCTION

(71) Applicant: ZHEJIANG DAHUA TECHNOLOGY CO., LTD., Zhejiang (CN)

(72) Inventor: Changjiu Yang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 194 days.

(21) Appl. No.: 16/886,808

(22) Filed: May 29, 2020

(65) Prior Publication Data

US 2020/0327643 A1  Oct. 15, 2020

Related U.S. Application Data

(63) Continuation of application No. PCT/CN2018/118074, filed on Nov. 29, 2018.

(30) Foreign Application Priority Data

Nov. 29, 2017 (CN) .......................... 201711228646.5

(51) Int. Cl.
*G06T 3/40* (2006.01)
*G06T 5/50* (2006.01)
*G06T 7/00* (2017.01)

(52) U.S. Cl.
CPC .......... *G06T 3/4053* (2013.01); *G06T 3/4007* (2013.01); *G06T 5/50* (2013.01);
(Continued)

(58) Field of Classification Search
None
See application file for complete search history.

(56) References Cited

U.S. PATENT DOCUMENTS 7,466,866 B2   12/2008  Steinberg
2004/0165010 A1*  8/2004  Robertson ............. G06F 3/0481
                                              715/805
(Continued)

FOREIGN PATENT DOCUMENTS

CN   102354397 A   2/2012
CN   103020936 A   4/2013
(Continued)

OTHER PUBLICATIONS

Shizhan Zhu et al., Deep Cascaded Bi-Network for Face Hallucination, 12th European Conference on Computer Vision (ECCV 2012), 614-630, 2016.
(Continued)

Primary Examiner — Jiangeng Sun
(74) Attorney, Agent, or Firm — Metis IP LLC

(57) ABSTRACT

A method for super-resolution image reconstruction may include obtaining an original image that has first resolution and includes a target object. The method may also include generating a first target image by increasing the first resolution of the original image. The method may also include determining first feature points relating to the target object based on the first target image. The method may also include determining first priori information relating to the target object based on the first feature points relating to the target object. The method may also include generating a second target image having second resolution higher than the first resolution based on the first priori information relating to the target object and the first target image.

20 Claims, 9 Drawing Sheets

(52) U.S. Cl.
CPC .. *G06T 7/0002* (2013.01); *G06T 2207/20016* (2013.01); *G06T 2207/20221* (2013.01); *G06T 2207/30201* (2013.01)

(56) References Cited

U.S. PATENT DOCUMENTS

| | | | | |
|---|---|---|---|---|
| 2012/0197096 A1* | 8/2012 | Ridder | ............... | G01J 3/0291 600/314 |
| 2018/0204051 A1* | 7/2018 | Li | ............... | G06T 5/001 |
| 2018/0204111 A1* | 7/2018 | Zadeh | ............... | G06N 3/0436 |
| 2019/0043125 A1* | 2/2019 | Cropper | ............... | G06F 40/247 |
| 2020/0258195 A1* | 8/2020 | Chuang | ............... | G06T 1/20 |

FOREIGN PATENT DOCUMENTS

| | | |
|---|---|---|
| CN | 103489174 A | 1/2014 |
| CN | 106599883 A | 4/2017 |
| JP | 2005071059 A | 3/2005 |
| JP | 4944639 B2 | 6/2012 |
| KR | 101382892 B1 | 4/2014 |
| WO | 2019105399 A1 | 6/2019 |

OTHER PUBLICATIONS

Chih-Yuan Yang et al., Structured Face Hallucination, 2013 IEEE Conference on Computer Vision and Pattern Recognition (CVPR), IEEE Computer Society, 2013, 8 pages.

The Extended European Search Report in European Application No. 16864331.2 dated Nov. 19, 2020, 11 pages.

International Search Report in PCT/CN2018/118074 dated Feb. 27, 2019, 4 pages.

Written Opinion in PCT/CN2018/118074 dated Feb. 27, 2019, 6 pages.

First Office Action in Chinese Application No. 201711228646.5 dated Aug. 30, 2019, 15 pages.

Dong, Chao et al., Image Super-Resolution Using Deep Convolutional Networks, IEEE Transactions on Pattern Analysis and Machine Intelligence, 2016, 14 pages.

Yin, Ruoxuan, Research on Learning-based Face Super Resolution Reconstruction, China Master's Theses Full-text Database, 2017, 75 pages.

* cited by examiner

SYSTEMS AND METHODS FOR SUPER-RESOLUSION IMAGE RECONSTRUCTION

CROSS-REFERENCE TO RELATED APPLICATIONS

This application is a Continuation of International Application No. PCT/CN2018/118074, filed on Nov. 29, 2018, which claims priority of Chinese Patent Application No. 201711228646.5, filed on Nov. 29, 2017, the contents of which are incorporated herein by reference.

TECHNICAL FIELD

This disclosure generally relates to image processing, and more particularly, to systems and methods for super-resolution image reconstruction.

BACKGROUND

Super-resolution image reconstruction refers to digital image processing techniques that produce high-resolution and high-quality images based on one or more low-resolution and low-quality images. The existing techniques of super-resolution image reconstruction may include traditional techniques and techniques based on deep learning. The traditional techniques mainly include non-uniform interpolation techniques, which are relatively more intuitive super-resolution algorithms. The non-uniform interpolation techniques include registering low-resolution image with a sub-pixel displacement to a grid of a high-resolution image, forming a composite image on an incompletely evenly spaced sampling grid, interpolating and resampling the composite image to obtain a super-resolution image. The disadvantage of the non-uniform interpolation technique is that the processed image may be fuzzy and with sawtooth. Further, traditional techniques and techniques based on deep learning for increasing image resolution may not consider information relating to typical characteristic of a target object (e.g., a nose, a mouth, eyes of a human face) during super-resolution image reconstruction, and may not perform well on image with extremely low resolution, failing to meet actual needs of users. Therefore, it is desired to provide systems and methods for improving the reconstruction result of the super-resolution image reconstruction

SUMMARY

According to a first aspect of the present disclosure, a system for super-resolution image reconstruction may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain an original image that has first resolution and includes a target object. The one or more processors may generate a first target image by increasing the first resolution of the original image. The one or more processors may determine first feature points relating to the target object based on the first target image. The one or more processors may determine first priori information relating to the target object based on the first feature points relating to the target object. The one or more processors may generate a second target image having second resolution higher than the first resolution based on the first priori information relating to the target object and the first target image.

In some embodiments, to generate the second target image, the one or more processors may determine, for each of one or more portions of the target object, at least one first local feature related to the portion based on the first priori information and the first target image. The one or more processors may determine at least one first high-frequency feature relating to the target object based on the first target image. The one or more processors may generate a first high-frequency image based on the one or more first local features, the at least one first high-frequency feature, and the first target image. The one or more processors may generate the second target image based on the first target image and the first high-frequency image.

In some embodiments, the original image may be taken by a camera.

In some embodiments, to obtain the original image, the one or more processors may obtain an image that includes the target object. The one or more processors may generate the original image by identifying the target object in the image to be processed.

In some embodiments, to determine the first priori information relating to the target object, the one or more processors may interpolate points to the first feature points relating to the target object.

In some embodiments, the one or more processors may determine whether the second resolution is greater than or equal to a resolution threshold. In response to a determination that the second resolution is less than the resolution threshold, the one or more processors may obtain a processed first target image by increasing resolution of the first target image, and obtain a processed second target image by increasing the second resolution. The one or more processors may obtain a combined image by combining the processed first target image and the processed second target image. The one or more processors may determine second feature points relating to the target object based on the combined image. The one or more processors may determine second priori information relating to the target object based on the second feature points relating to the target object. The one or more processors may generate a third target image having third resolution higher than the second resolution based on the second priori information relating to the target object, the processed first target image, and the processed second target image.

In some embodiments, to generate the third target image, the one or more processors may determine, for each of the one or more portions of the target object, at least one second local feature related to the portion based on the second priori information, the processed first target image, and the processed second target image. The one or more processors may determine at least one second high-frequency feature relating to the target object based on the processed first target image and the processed second target image. The one or more processors may determine the third target image based on the one or more second local features, the at least one second high-frequency features, the processed first target image, and the processed second target image.

In some embodiments, the one or more processors may determine whether the third resolution is greater than or equal to the resolution threshold. The one or more processors may obtain a fourth target image by increasing the third resolution in response to a determination that the third resolution is less than the resolution threshold. The one or more processors may determine third feature points relating to the target object based on the fourth target image. The one or more processors may determine third priori information relating to the target object based on the third feature points relating to the target object. The one or more processors may generate a fifth target image having fourth resolution based on the third priori information relating to the target object and the fourth target image, the fourth resolution being higher than the third resolution.

In some embodiments, to generate the fifth target image having the fourth resolution, the one or more processors may determine, for each of the one or more portions of the target object, at least one third local feature related to the portion based on the third priori information and the fourth target image. The one or more processors may generate the fifth target image based on the one or more third local features and the fourth target image.

In some embodiments, the target object may include one or more faces.

According to another aspect of the present disclosure, a method for super-resolution image reconstruction may include one or more of the following operations. One or more processors may obtain an original image that has first resolution and includes a target object. The one or more processors may generate a first target image by increasing the first resolution of the original image. The one or more processors may determine first feature points relating to the target object based on the first target image. The one or more processors may determine first priori information relating to the target object based on the first feature points relating to the target object. The one or more processors may generate a second target image having second resolution higher than the first resolution based on the first priori information relating to the target object and the first target image.

According to yet another aspect of the present disclosure, a system for super-resolution image reconstruction may include an obtaining module configured to obtain an original image that has first resolution and includes a target object. The system may also include a resolution increasing module configured to generate a first target image by increasing the first resolution of the original image. The system may also include a feature point determination module configured to determine first feature points relating to the target object based on the first target image. The system may also include a priori information determination module configured to determine first priori information relating to the target object based on the first feature points relating to the target object. The system may also include a combination module configured to generate a second target image having second resolution higher than the first resolution based on the first priori information relating to the target object and the first target image.

According to yet another aspect of the present disclosure, a non-transitory computer readable medium may comprise at least one set of instructions for super-resolution image reconstruction. The at least one set of instructions may be executed by one or more processors of a computer server. The one or more processors may obtain an original image that has first resolution and includes a target object. The one or more processors may generate a first target image by increasing the first resolution of the original image. The one or more processors may determine first feature points relating to the target object based on the first target image. The one or more processors may determine first priori information relating to the target object based on the first feature points relating to the target object. The one or more processors may generate a second target image having second resolution higher than the first resolution based on the first priori information relating to the target object and the first target image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
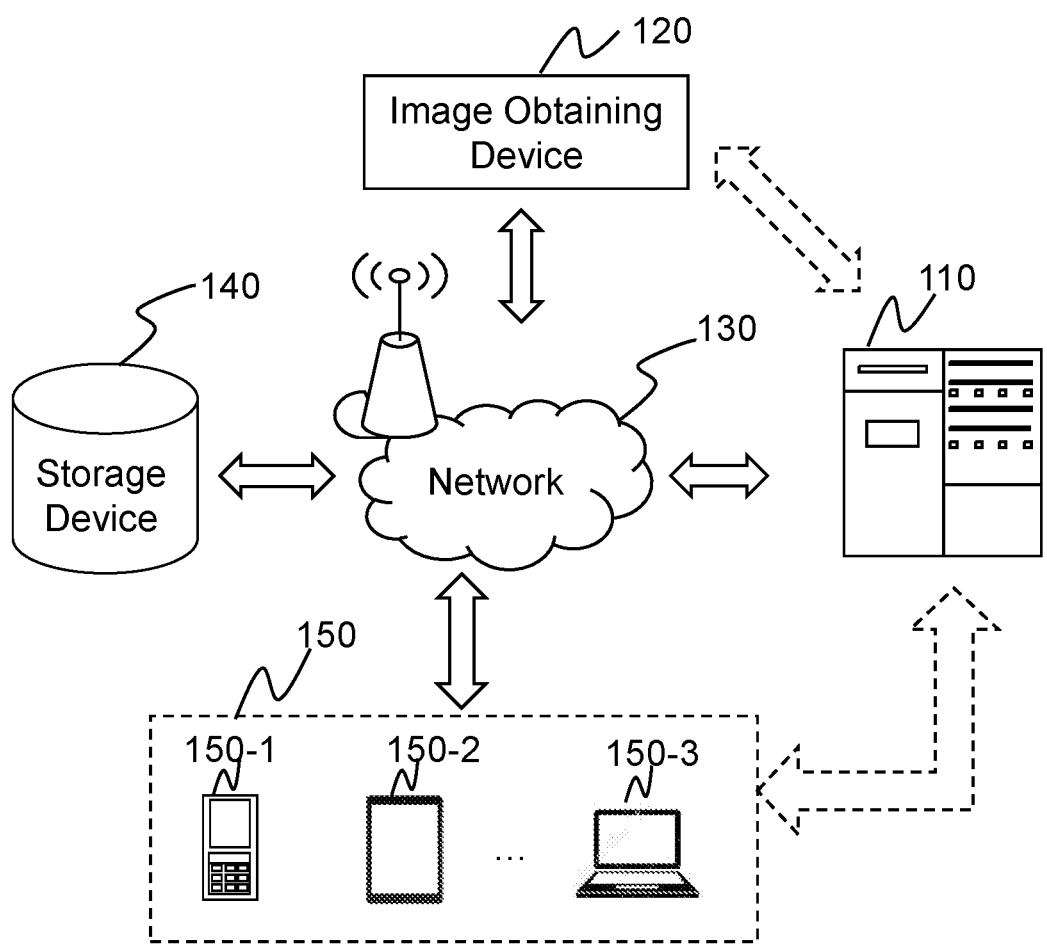
FIG. 1 is a schematic diagram illustrating an exemplary image processing system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for super-resolution image reconstruction. In some cases, a user wants to increase the resolution of an original image including a human face. To this end, the system may generate a first target image by preliminarily increasing the resolution of the original image using a bicubic interpolation algorithm. Using techniques based on deep learning, the system then may generate a second target image to further increase the resolution. Different from the existing techniques of super-resolution image reconstruction, the system in this disclosure may further consider priori information relating to typical characteristic of the human face (e.g., a nose, a mouth, eyes, ears, eyebrows, the face contour, etc.) or other objects in the image during the super-resolution image reconstruction. For example, after generating the first target image, the system may determine feature points related to a nose, a mouth, eyes, ears, eyebrows, the face contour, etc. in the first target image. The system may generate priori information including one or more masks by interpolating points to the feature points using an interpolation algorithm. Each mask may relate to a portion (e.g., a nose, a mouth, eyes, ears, eyebrows, the face contour, etc.) of the human face. The system may determine detail information related to at least one portion of the human face based on the priori information. The system may generate the second target image with higher resolution based on the detail information related to at least one portion of the human face.

Super-resolution image reconstruction may refer to digital image processing techniques that produce high-resolution and high-quality images based on one or more low-resolution and low-quality images. As used herein, the resolution of an image may refers to the spatial resolution of the image, for example, the number of pixels per length unit (e.g., the number of pixels per inch) or per area unit (e.g., the number of pixels per square inch). The unit of resolution may be dpi (dots per inch) or ppi (pixels per inch). It is easy to understand that the greater the resolution, the greater the amount of image information and the clearer the image. Obtaining an image with relatively higher resolution based on an image with relatively low resolution is a process of "throw out of nothing," for example, estimating more information from the available information.

As a technique for improving image quality without improving hardware devices, super-resolution image reconstruction has a wide range of application prospects in fields such as video surveillance, medical imaging, remote sensing images, or the like, or any combination thereof. For example, in video surveillance, the super-resolution image reconstruction may be applicable to enlarged display for a freeze frame and/or a specific area of a frame in a video (e.g., identifying a car in the video), and improvement of the resolution of a target object (e.g., the face of a suspect) to recognize the target object. As another example, in medical imaging (e.g., Computed Tomography (CT), Magnetic Resonance Imaging (MRI), etc.), the super-resolution image reconstruction may be applicable to reconstructing high-resolution medical images based on several available low-resolution medical images. As still another example, in video standard conversion, the super-resolution image reconstruction may be applicable to conversion from National Television Systems Committee (NTSC) video signals to High Definition Television (HDTV) video signals.

The term "image" used in this disclosure may refer to a two-dimensional (2D) image, a three-dimensional (3D) image, and/or any related image data. It should be noted that in this disclosure, the terms "image data" and "image" may be used interchangeably. This is not intended to limit the scope the present disclosure. For persons having ordinary skills in the art, a certain amount of variations, changes, and/or modifications may be deducted under the guidance of the present disclosure.

FIG. 1 is a schematic diagram illustrating an exemplary image processing system according to some embodiments of the present disclosure. The image processing system 100 may be configured to process an image (or a frame) or a video including a plurality of images (also referred to as "video frames"). As shown in FIG. 1, the image processing system 100 may include a processing device 110, an image obtaining device 120, a network 130, a storage device 140, and a terminal 150. The components in the image processing system 100 may be connected in one or more of various ways. Merely by way of example, the processing device 110 may be connected to the image obtaining device 110 through the network 130. As another example, the processing device 110 may be connected to the image obtaining device 120 directly as indicated by the bi-directional arrow in dotted lines linking the processing device 110 and the image obtaining device 120. As a further example, the storage device 140 may be connected to the processing device 110 directly or through the network 130. As still a further example, the terminal 150 may be connected to the processing device 110 directly (as indicated by the bi-directional arrow in dotted lines linking the terminal 150 and the processing device 110) or through the network 130.

The processing device 110 may process data and/or information obtained from the image obtaining device 120, the storage device 140, and/or the terminal 150. For example, the processing device 110 may obtain an image with relatively low resolution from the image obtaining device 120, the storage device 140, and/or the terminal 150, and generate an image with relatively high resolution based on the image with relatively low resolution. In some embodiments, the processing device 110 may be local or remote to the terminal 150 and/or the image obtaining device 120. For example, the processing device 110 may access information and/or data stored in the storage device 140 via the network 130. As another example, the processing device 110 may be directly connected to the storage device 140.

The processing device 110 may be a server (e.g., a computer or a group of computers) for storing, broadcasting, selling, renting, or providing videos. In some embodiments, the processing device 110 may be any suitable device that is capable of processing an image. For example, the processing device 110 may include a high-performance computer specializing in image processing or transaction processing, a personal computer, a portable device, a server, a microprocessor, an integrated chip, a digital signal processor (DSP), a tablet computer, a personal digital assistant (PDA), a mobile phone, or the like, or a combination thereof. In some embodiments, the processing device 110 may be implemented on a computing device 200 shown in FIG. 2.

In some embodiments, the processing device 110 may include one or more processing engines (e.g., single-core processing engine(s) or multi-core processor(s)). Merely by way of example, the processing device 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the image obtaining device 120 may generate/capture one or more images. For example, the image obtaining device 120 may include a camera, a medical imaging device, etc. The camera may be a panoramic camera, a digital camera, a video camera, a security camera, a web camera, a smartphone, a tablet, a laptop, a video gaming console equipped with a web camera, a camera with multiple lenses, etc. The medical imaging device may include a CT device, a digital radiography (DR) device, a C-arm X-ray device, a digital substraction angiography (DSA) device, a dynamic spatial reconstructor (DSR) device, an X-ray microscopy device, an MRI device, a positron emission tomography (PET) device, a multi-modality device, or the like, or a combination thereof. Exemplary multi-modality scanners may include a computed tomography-positron emission tomography (CT-PET) scanner, a computed tomography-magnetic resonance imaging (CT-MRI) scanner, etc. In some embodiments, the processing device 110 and the image obtaining device 120 may be combined as a single device.

In some embodiments, the image obtaining device 120 may transmit one or more images to the processing device 110, the storage device 140, or the terminal 150 in real time (e.g., in a video surveillance system) or periodically. In some embodiments, the image obtaining device 120 may transmit one or more images to the processing device 110, the storage device 140, or the terminal 150 based on a user instruction.

The network 130 may facilitate exchange of information and/or data. In some embodiments, one or more components of the image processing system 100 (e.g., the processing device 110, the image obtaining device 120, the storage device 140, or the terminal 150) may send information and/or data to another component(s) in the image processing system 100 via the network 130. For example, the processing device 110 may obtain, via the network 130, an image from the image obtaining device 120, the storage device 140, or the terminal 150. In some embodiments, the network 130 may be any type of wired or wireless network, or combination thereof. The network 130 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 130 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 130 may include one or more network access points. For example, the network 130 may include wired or wireless network access points such as base stations and/or internet exchange points through which one or more components of the image processing system 100 may be connected to the network 130 to exchange data and/or information.

The storage device 140 may store data, instructions, and/or any other information. In some embodiments, the storage device 140 may store data obtained from the processing device 110 and/or the image obtaining device 120. For example, the storage device 140 may store high-resolution images generated by the processing device 110. As another example, the storage device 140 may store images obtained from the image obtaining device 120 and/or the terminal 150. In some embodiments, the storage device 140 may store data and/or instructions that the processing device 110 may execute or use to perform exemplary methods described in the present disclosure. For example, the storage device 140 may store data and/or instructions that the processing device 110 may execute or use to generate an image with relatively high resolution image based on an image with relatively low resolution. In some embodiments, the storage device 140 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more other components of the image processing system 100 (e.g., the processing device 110, the image obtaining device 120, or the terminal 150). One or more components of the image processing system 100 may access the data or instructions stored in the storage device 140 via the network 130. In some embodiments, the storage device 140 may be directly connected to or communicate with one or more other components in the image processing system 100 (e.g., the processing device 110, the image obtaining device 120, or the terminal 150). In some embodiments, the storage device 140 may be part of the processing device 110.

The terminal 150 include a mobile device 150-1, a tablet computer 150-2, a laptop computer 150-3, or the like, or any combination thereof. In some embodiments, the mobile device 150-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 150 may remotely operate the processing device 110 and/or the image obtaining device 120. In some embodiments, the terminal 150 may operate the processing device 110 and/or the image obtaining device 120 via a wireless connection. In some embodiments, the terminal 150 may receive information and/or instructions inputted by a user, and send the received information and/or instructions to the processing device 110 and/or the image obtaining device 120 via the network 130. In some embodiments, the terminal 150 may receive data and/or information from the processing device 110 and/or the image obtaining device 120. In some embodiments, the terminal 150 may be part of the processing device 110 or the image obtaining device 120. In some embodiments, the terminal 150 may be omitted.

Figure 2:
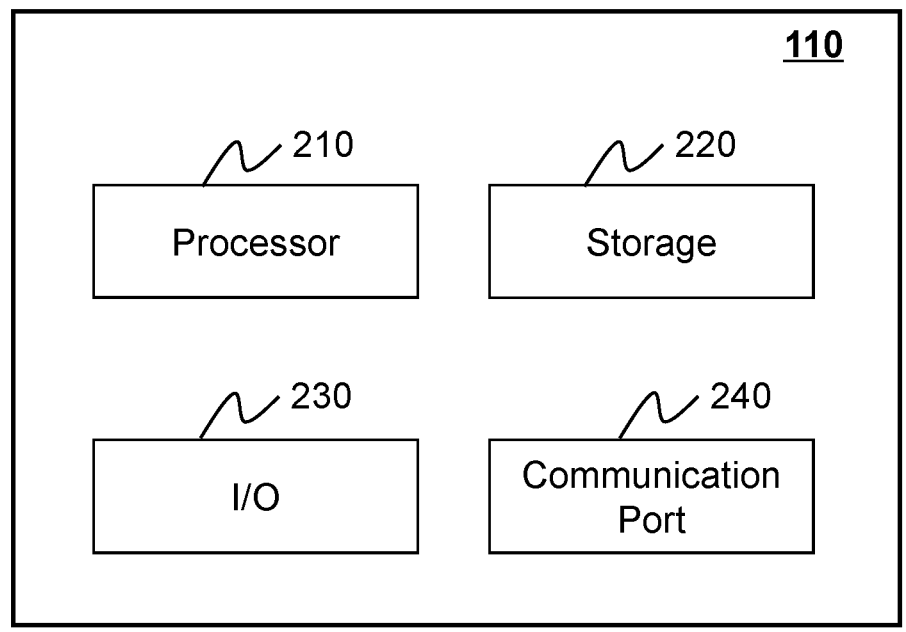
FIG. 2 is a schematic diagram illustrating exemplary hardware and/or software components of a computing device of a computing device according to some embodiments of the present disclosure.

FIG. 2 is a schematic diagram illustrating exemplary hardware and/or software components of an exemplary computing device 200 on which the processing device 110 and/or the image obtaining device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 110 in accordance with techniques described herein. The computer instructions may include, for example, routines, programs, objects, components, data structures, procedures, modules, and functions, which perform particular functions described herein. For example, the processor 210 may process an image obtained from the image obtaining device 120, the storage device 140, the terminal 150, and/or any other component of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the image obtaining device 120, the storage device 140, the terminal 150, and/or any other component of the image processing system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 110 for generating an image with relatively high resolution based on an image with relatively low resolution.

The I/O 230 may input and/or output signals, data, information, etc. In some embodiments, the I/O 230 may enable a user interaction with the processing device 110. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 130) to facilitate data communications. The communication port 240 may establish connections between the processing device 110 and the image obtaining device 120, the terminal 150, and/or the storage device 140. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof.

Figure 3:
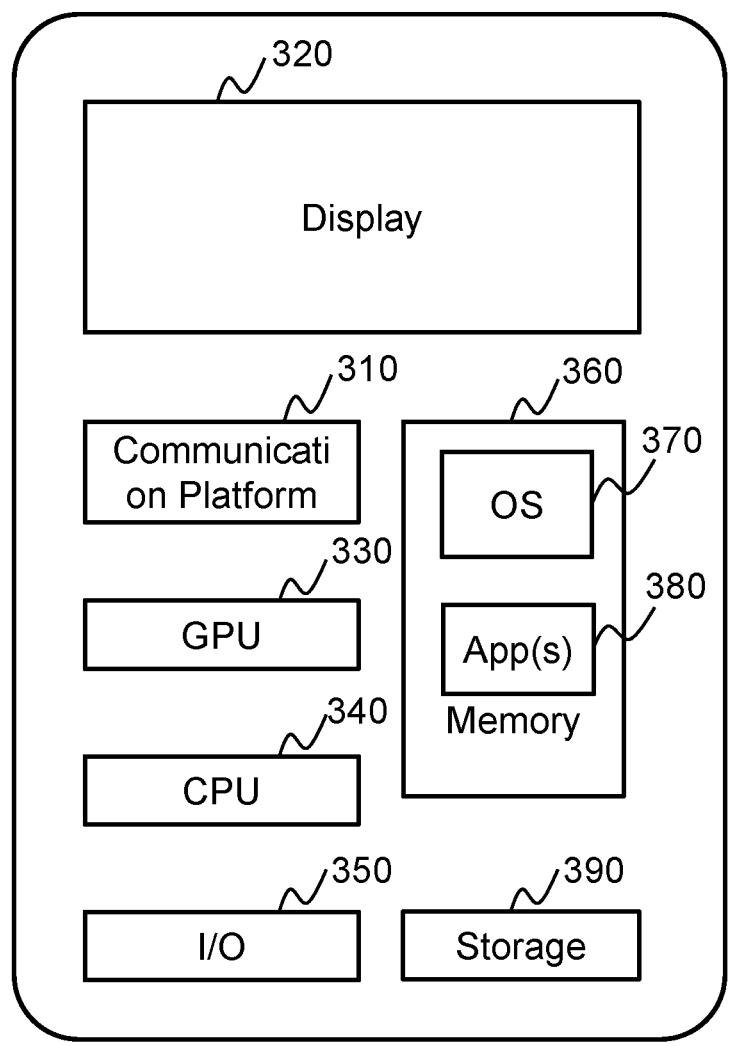
FIG. 3 is a schematic diagram illustrating hardware and/or software components of a mobile device according to some embodiments of the present disclosure.

FIG. 3 is a schematic diagram illustrating hardware and/or software components of a mobile device according to some embodiments of the present disclosure. In some embodiments, the terminal 150 and/or the image obtaining device 120 may be implemented on the mobile device 300. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate high-quality image of a scan object as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

For brevity, the description of increasing image resolution in the present disclosure may take 2D images as an example. It should be noted that the methods and/or systems for increasing image resolution described below are merely some examples or implementations. For persons having ordinary skills in the art, the methods and/or systems for increasing image resolution in the present disclosure may be applied to other similar situations, such as 3D images.

Figure 4:
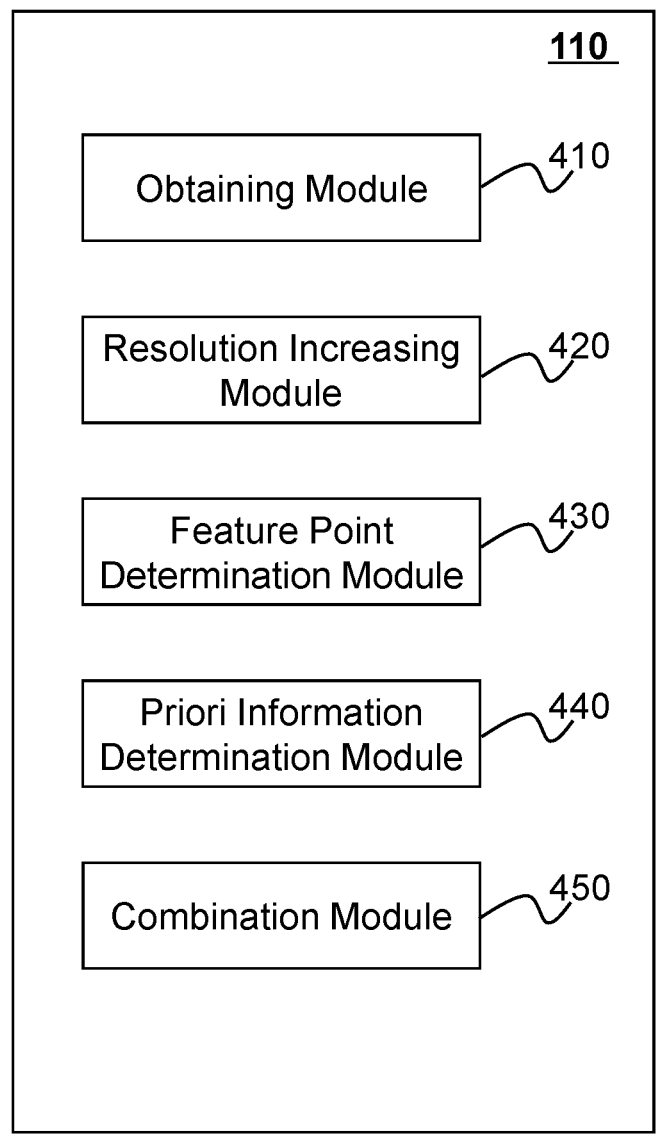
FIG. 4 is a block diagram illustrating an exemplary processing device according to some embodiments of the present disclosure.

FIG. 4 is a block diagram illustrating an exemplary processing device 110 according to some embodiments of the present disclosure of the present disclosure. The processing device 110 may include an obtaining module 410, a resolution increasing module 420, a feature point determination module 430, a priori information determination module 440, and a combination module 450. The processing device 110 may include more or fewer components without loss of generality. For example, two of the modules may be combined into a single module, or one of the modules may be divided into two or more modules. As another example, one or more of the modules may reside on different computing devices (e.g., a desktop, a laptop, a mobile device, a tablet computer, a wearable computing device, or the like, or a combination thereof). As still another example, the processing device 110 may be implemented on the computing device 200 shown in FIG. 2.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The obtaining module 410 may obtain an original image with a first resolution and including a target object (e.g., a vehicle, a human face, etc.). In some embodiments, the original image may be a complete image obtained from the storage device 140, the terminal 150, or the image obtaining device 120. In some embodiments, the original image may be a region of interest (ROI) of an image to be processed. For example, the obtaining module 410 may obtain the image to be processed from the storage device 140, the terminal 150, or the image obtaining device 120. The obtaining module 410 may obtain the original image by identifying the target object in the image to be processed.

The resolution increasing module 420 may generate a first target image by increasing the first resolution of the original image.

The first resolution may be increased at any value, such as 2 times, 3 times, 4 times, etc. The resolution increasing module 420 may perform a non-uniform interpolation technique to increase the first resolution. Exemplary non-uniform interpolation technique may include a bicubic interpolation, a nearest neighbor interpolation, a bilinear interpolation, an adaptive interpolation, or the like, or any combination thereof.

For illustration purposes, the present disclosure may take the bicubic interpolation to the 2D original image as an example. The resolution increasing module 420 may generate an intermediate image having a size and a number of pixels desired by the first target image. The resolution increasing module 420 may determine a pixel value for each pixel in the intermediate image and generate the first target image. For example, for one of the pixels in the intermediate image, the resolution increasing module 420 may determine coordinates (e.g., P (X, Y)) thereof under a first coordinate system of the intermediate image (e.g., a coordinate system of which the origin is the center pixel of the intermediate image and the X axis and Y axis are parallel to the four sides of the intermediate image, respectively). The resolution increasing module 420 may transform the coordinates P (X, Y) into p (x, y) under a second coordinate system of the original image (e.g., a coordinate system of which the origin is the center pixel of the original image and the X axis and Y axis are parallel to the four sides of the original image, respectively). The resolution increasing module 420 may determine 16 nearest pixels to p (x, y) in the original image. The resolution increasing module 420 may determine a weight for each of the 16 nearest pixels by solving the bicubic function. The resolution increasing module 420 may determine the pixel value at P (X, Y) based on a weighted average of the pixel values of the 16 nearest pixels.

Figure 9:
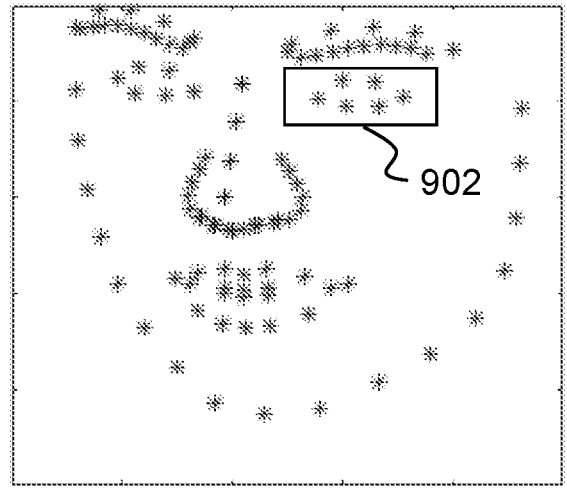
FIG. 9 is a schematic diagram illustrating an example of feature points according to some embodiments of the present disclosure.

The feature point determination module 430 may determine first feature points of the target object based on the first target image. As used herein, the feature points may refer to pixels relating to one or more features of the target object in an image. For example, if the target object is a human face, the first feature points may include pixels relating to a nose, a mouth, an eye, an eyebrow, an ear, a face contour, or the like, or any combination thereof, in the first target image (as shown in FIG. 9).

Merely by way of example, the feature point determination module 430 may generate a first processed image by processing the first target image using a Super-Resolution Using Deep Convolutional Neural Network (SRCNN) to increase the resolution of the first target image. The feature point determination module 430 may generate a second processed image by increasing the resolution of the first processed image using the bicubic interpolation. The feature point determination module 430 may generate a third processed image by processing the second processed image using the SRCNN to increase the resolution of the second process image. The feature point determination module 430 may determine the first feature points by processing the third processed image using a Deformation Coefficients Prediction Network (DCPN).

Figure 10:
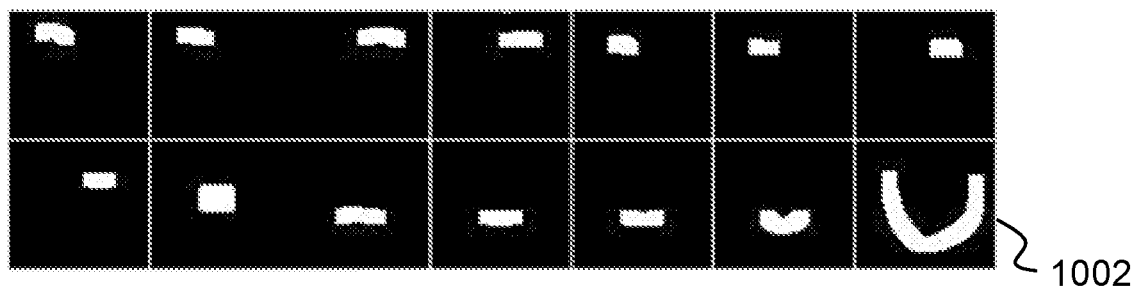
FIG. 10 is a schematic diagram illustrating an example of priori information according to some embodiments of the present disclosure.

The priori information determination module 440 may determine first priori information of the target object based on the first feature points of the target object. As used herein, the priori information may include one or more masks of the feature points of an image. A mask may be a matrix depicting a portion (also referred to as a feature) of the target object in the image. In the mask, elements (or pixel values) corresponding to the portion may be set as 1, and other elements may be set as 0 (as shown in FIG. 10). In this way, when the mask is multiplied by an image, pixels in the image corresponding to the elements that are set as 1 may be kept, and pixels in the image corresponding to other elements that are set as 0 may be filtered out. The priori information determination module 440 may interpolate points to the first feature points of the target object using an interpolation algorithm. Exemplary interpolation algorithm may include a bicubic interpolation algorithm, a nearest neighbor interpolation algorithm, a bilinear interpolation algorithm, an adaptive interpolation algorithm, or the like, or any combination thereof.

The combination module 450 may generate a second target image having second resolution based on the first priori information of the target object and the first target image. The second resolution may be higher than the first resolution.

In some embodiments, for each of one or more portions (also referred to one or more features) of the target object, the combination module 450 may determine at least one first local feature of the portion based on the first priori information and the first target image. The first local feature of the portion may include detail information for the portion of the target object in the first target image. For example, if the target object is a human face, the one or more portions may include a nose, an eye, an eyebrow, a mouth, an ear, a face contour, or the like, or any combination thereof.

Merely by way of example, the combination module 450 may multiply the first priori information (e.g., the one or more masks) by the first target image to determine at least one region of interest (ROI) in the first target image. Each of the at least one ROI may include a portion (e.g., a nose, a mouth, eyes, ears, eyebrows, the face contour, etc.) of the target object. The combination module 450 may determine the at least one first local feature for each of the one or more portions of the target object by processing the at least one ROI in the first target image using a High Frequency Branch Convolutional Neural Network (HFBCNN).

The combination module 450 may determine at least one first high-frequency feature of the first target image by processing the first target image using, for example, a Common Branch Convolutional Neural Network (CBCNN). In some embodiments, general information of an image may include high-frequency features and low-frequency features. The high-frequency features of an image may represent information of a region in the image in which the difference of the pixel values is relatively large, and the low-frequency features of the image may represent information of a region in the image in which the difference of the pixel values is relatively small. For example, if the target object is a human face, the high-frequency feature may include information of a region including more textures of the human face in the image.

The combination module 450 may determine a first high-frequency image based on the one or more first local features, the at least one first high-frequency feature, and the first target image.

Merely by way of example, the combination module 450 may generate a first fusion image by combining the one or more first local features, the at least one first high-frequency feature, and the first target image using a Fusion Convolutional Neural Network (FCNN). The combination module 450 may generate a first processed fusion image by multiplying the one or more first local features by corresponding pixel values in the first fusion image. The combination module 450 may generate a second processed fusion image by multiplying the at least one first high-frequency feature by corresponding pixel values in the first fusion image. The combination module 450 may generate the first high-frequency image by adding pixel values in the first processed fusion image to corresponding pixel values in the second processed fusion image, respectively.

The combination module 450 may determine the second target image based on the first target image and the first high-frequency image. Merely by way of example, the combination module 450 may determine the second target image by adding pixel values in the first target image to corresponding pixel values in the first high-frequency image, respectively.

In some embodiments, the combination module 450 may also determine whether the second resolution of the second target image meets a specific condition (e.g., the combination module 450 may determine whether the second resolution of the second target image is greater than or equal to a resolution threshold). In response to a determination that the second resolution meets the specific condition (e.g., the second resolution of the second target image is greater than or equal to the resolution threshold), the combination module 450 may output the second target image through, for example, the I/O 230 of the processing device 110. In response to a determination that the second resolution does not meet the specific condition (e.g., the second resolution of the second target image is less than the resolution threshold), the processing device 110 may process the second target image to increase the second resolution. More details regarding increasing the second resolution may be found elsewhere in the present disclosure (e.g., the description in connection with FIG. 6).

In some embodiments, the specific condition (e.g., the resolution threshold) may be default of the image processing system 100, or set by a user (e.g., an operator) of the image processing system 100.

It should be noted that the above description of process 400 is merely provided for the purposes of illustration, and not intended to be understood as the only embodiment. For persons having ordinary skills in the art, various variations and modifications may be conduct under the teaching of some embodiments of the present disclosure. In some embodiments, some steps may be reduced or added. However, those variations and modifications may not depart from the protecting of some embodiments of the present disclosure. For example, the processing device 110 may further include a storage module (not shown in FIG. 4). The storage module may be configured to store data generated during any process performed by any component of in the processing device 110. As another example, each of components of the processing device 110 may include a storage device. Additionally or alternatively, the components of the processing device 110 may share a common storage device.

Figure 5:
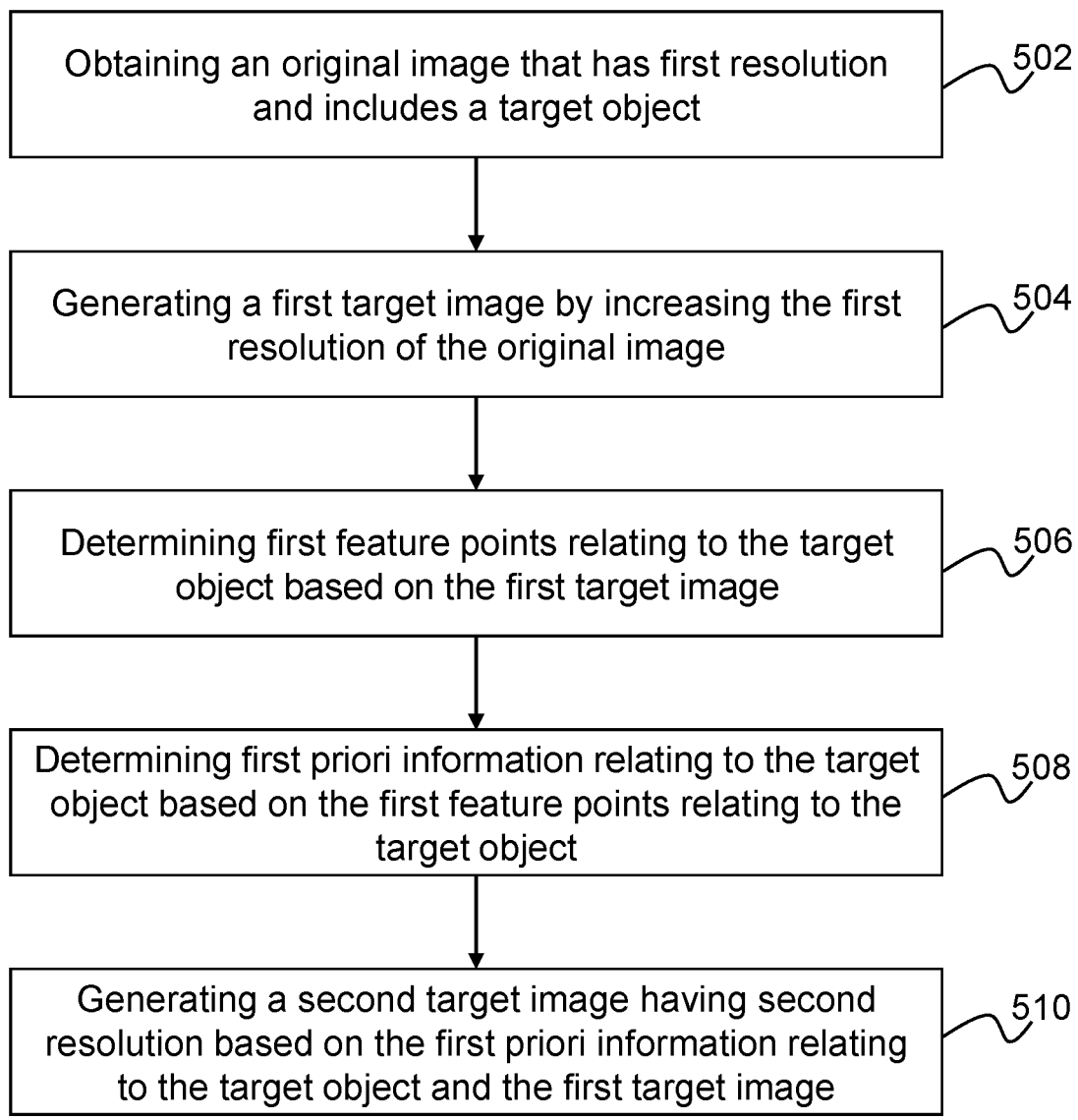
FIG. 5 is a flow chart illustrating an exemplary process for increasing image resolution according to some embodiments of the present disclosure.

FIG. 5 is a flow chart illustrating an exemplary process for increasing image resolution according to some embodiments of the present disclosure. In some embodiments, the process 500 may be implemented on the image processing system 100 as illustrated in FIG. 1. For example, the process 500 may be stored in a storage medium (e.g., the storage device 140, or the storage 220 of the processing device 110) as the form of instructions, and invoked and/or executed by the processing device 110. The operations in the process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below may not be intended to be limiting.

In 502, the obtaining module 410 may obtain an original image with a first resolution and including a target object (e.g., a vehicle, a human face, etc.). In some embodiments, the original image may be a complete image obtained from the storage device 140, the terminal 150, or the image obtaining device 120. In some embodiments, the original image may be a region of interest (ROI) of an image to be processed. For example, the obtaining module 410 may obtain the image to be processed from the storage device 140, the terminal 150, or the image obtaining device 120. The obtaining module 410 may obtain the original image by identifying the target object in the image to be processed.

In 504, the resolution increasing module 420 may generate a first target image by increasing the first resolution of the original image.

The first resolution may be increased at any value, such as 2 times, 3 times, 4 times, etc. The resolution increasing module 420 may perform a non-uniform interpolation technique to increase the first resolution. Exemplary non-uniform interpolation technique may include a bicubic interpolation, a nearest neighbor interpolation, a bilinear interpolation, an adaptive interpolation, or the like, or any combination thereof.

For illustration purposes, the present disclosure may take the bicubic interpolation to the 2D original image as an example. The resolution increasing module 420 may generate an intermediate image having a size and a number of pixels desired by the first target image. The resolution increasing module 420 may determine a pixel value for each pixel in the intermediate image and generate the first target image. For example, for one of the pixels in the intermediate image, the resolution increasing module 420 may determine coordinates (e.g., P (X, Y)) thereof under a first coordinate system of the intermediate image (e.g., a coordinate system of which the origin is the center pixel of the intermediate image and the X axis and Y axis are parallel to the four sides of the intermediate image, respectively). The resolution increasing module 420 may transform the coordinates P (X, Y) into p (x, y) under a second coordinate system of the original image (e.g., a coordinate system of which the origin is the center pixel of the original image and the X axis and Y axis are parallel to the four sides of the original image, respectively). The resolution increasing module 420 may determine 16 nearest pixels to p (x, y) in the original image. The resolution increasing module 420 may determine a weight for each of the 16 nearest pixels by solving the bicubic function. The resolution increasing module 420 may determine the pixel value at P (X, Y) based on a weighted average of the pixel values of the 16 nearest pixels.

In 506, the feature point determination module 430 may determine first feature points of the target object based on the first target image. As used herein, the feature points may refer to pixels relating to one or more features of the target object in an image. For example, if the target object is a human face, the first feature points may include pixels relating to a nose, a mouth, an eye, an eyebrow, an ear, a face contour, or the like, or any combination thereof, in the first target image (as shown in FIG. 9).

Merely by way of example, the feature point determination module 430 may generate a first processed image by processing the first target image using a Super-Resolution Using Deep Convolutional Neural Network (SRCNN) to increase the resolution of the first target image. The feature point determination module 430 may generate a second processed image by increasing the resolution of the first processed image using the bicubic interpolation. The feature point determination module 430 may generate a third processed image by processing the second processed image using the SRCNN to increase the resolution of the second process image. The feature point determination module 430 may determine the first feature points by processing the third processed image using a Deformation Coefficients Prediction Network (DCPN).

In 508, the priori information determination module 440 may determine first priori information of the target object based on the first feature points of the target object. As used herein, the priori information may include one or more masks of the feature points of an image. A mask may be a matrix depicting a portion (also referred to as a feature) of the target object in the image. In the mask, elements (or pixel values) corresponding to the portion may be set as 1, and other elements may be set as 0 (as shown in FIG. 10). In this way, when the mask is multiplied by an image, pixels in the image corresponding to the elements that are set as 1 may be kept, and pixels in the image corresponding to other elements that are set as 0 may be filtered out. The priori information determination module 440 may interpolate points to the first feature points of the target object using an interpolation algorithm. Exemplary interpolation algorithm may include a bicubic interpolation algorithm, a nearest neighbor interpolation algorithm, a bilinear interpolation algorithm, an adaptive interpolation algorithm, or the like, or any combination thereof.

In 510, the combination module 450 may generate a second target image having second resolution based on the first priori information of the target object and the first target image. The second resolution may be higher than the first resolution.

In some embodiments, for each of one or more portions (also referred to one or more features) of the target object, the combination module 450 may determine at least one first local feature of the portion based on the first priori information and the first target image. The first local feature of the portion may include detail information for the portion of the target object in the first target image. For example, if the target object is a human face, the one or more portions may include a nose, an eye, an eyebrow, a mouth, an ear, a face contour, or the like, or any combination thereof.

Merely by way of example, the combination module 450 may multiply the first priori information (e.g., the one or more masks) by the first target image to determine at least one region of interest (ROI) in the first target image. Each of the at least one ROI may include a portion (e.g., a nose, a mouth, eyes, ears, eyebrows, the face contour, etc.) of the target object. The combination module 450 may determine the at least one first local feature for each of the one or more portions of the target object by processing the at least one ROI in the first target image using a High Frequency Branch Convolutional Neural Network (HFBCNN).

The combination module 450 may determine at least one first high-frequency feature of the first target image by processing the first target image using, for example, a Common Branch Convolutional Neural Network (CBCNN). In some embodiments, general information of an image may include high-frequency features and low-frequency features. The high-frequency features of an image may represent information of a region in the image in which the difference of the pixel values is relatively large, and the low-frequency features of the image may represent information of a region in the image in which the difference of the pixel values is relatively small. For example, if the target object is a human face, the high-frequency feature may include information of a region including more textures of the human face in the image.

The combination module 450 may determine a first high-frequency image based on the one or more first local features, the at least one first high-frequency feature, and the first target image.

Merely by way of example, the combination module 450 may generate a first fusion image by combining the one or more first local features, the at least one first high-frequency feature, and the first target image using a Fusion Convolutional Neural Network (FCNN). The combination module 450 may generate a first processed fusion image by multiplying the one or more first local features by corresponding pixel values in the first fusion image. The combination module 450 may generate a second processed fusion image by multiplying the at least one first high-frequency feature by corresponding pixel values in the first fusion image. The combination module 450 may generate the first high-frequency image by adding pixel values in the first processed fusion image to corresponding pixel values in the second processed fusion image, respectively.

The combination module 450 may determine the second target image based on the first target image and the first high-frequency image. Merely by way of example, the combination module 450 may determine the second target image by adding pixel values in the first target image to corresponding pixel values in the first high-frequency image, respectively.

After executing 510, the combination module 450 may determine whether the second resolution of the second target image meets a specific condition (e.g., the combination module 450 may determine whether the second resolution of the second target image is greater than or equal to a resolution threshold). In response to a determination that the second resolution meets the specific condition (e.g., the second resolution of the second target image is greater than or equal to the resolution threshold), the combination module 450 may output the second target image through, for example, the I/O 230 of the processing device 110. In response to a determination that the second resolution does not meet the specific condition (e.g., the second resolution of the second target image is less than the resolution threshold), the processing device 110 may process the second target image to increase the second resolution. More details regarding increasing the second resolution may be found elsewhere in the present disclosure (e.g., the description in connection with FIG. 6).

In some embodiments, the specific condition (e.g., the resolution threshold) may be default of the image processing system 100, or set by a user (e.g., an operator) of the image processing system 100.

It should be noted that the above description of process 400 is merely provided for the purposes of illustration, and not intended to be understood as the only embodiment. For persons having ordinary skills in the art, various variations and modifications may be conduct under the teaching of some embodiments of the present disclosure. In some embodiments, some steps may be reduced or added. However, those variations and modifications may not depart from the protecting of some embodiments of the present disclosure.

Figure 6:
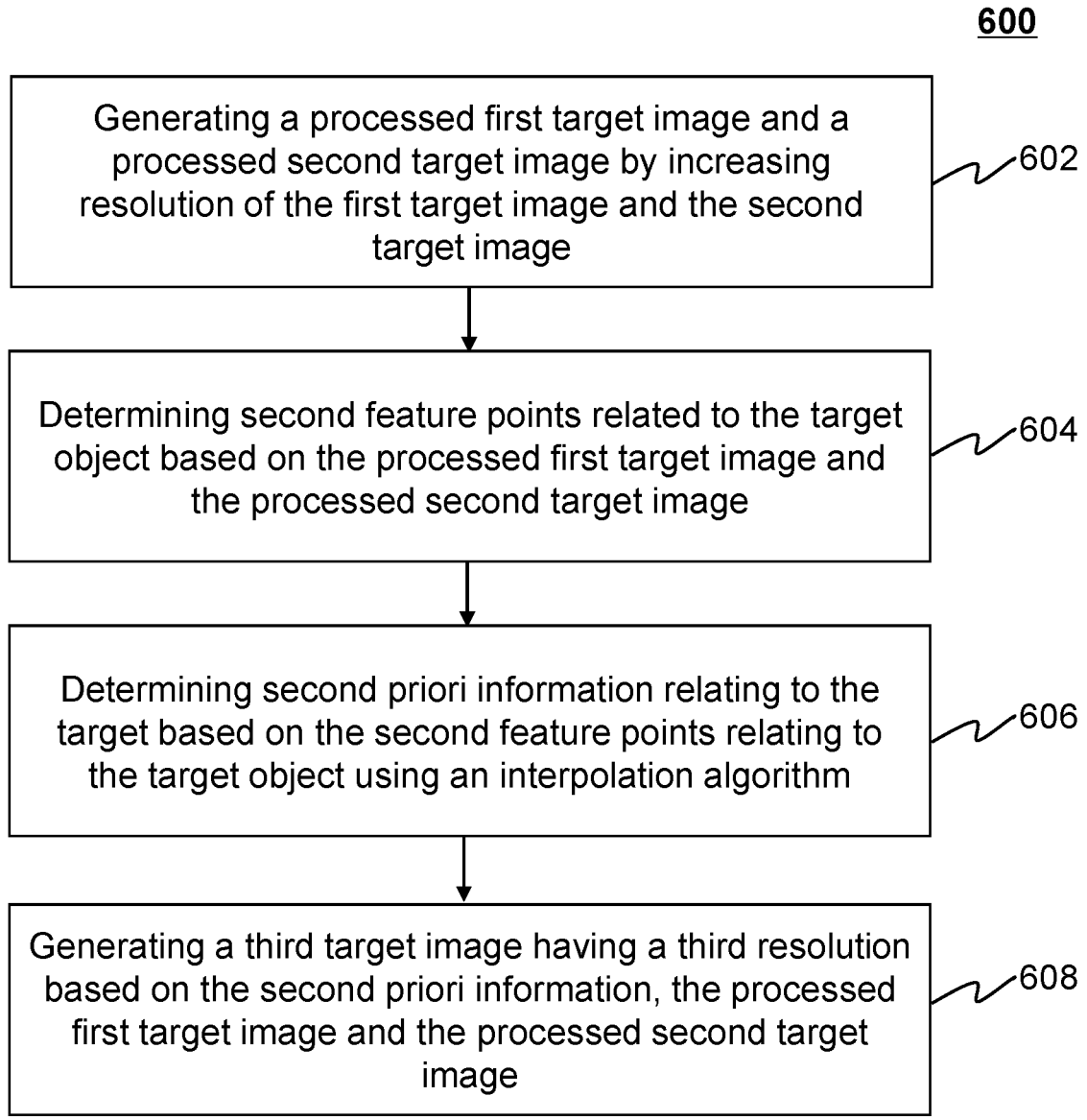
FIG. 6 is a flow chart illustrating an exemplary process for increasing image resolution according to some embodiments of the present disclosure.

FIG. 6 is a flow chart illustrating an exemplary process for increasing the resolution of an image according to some embodiments of the present disclosure. In some embodiments, the process 600 may be implemented on the image processing system 100 as illustrated in FIG. 1. For example, the process 600 may be stored in a storage medium (e.g., the storage device 140, or the storage 220 of the processing device 110) as the form of instructions, and invoked and/or executed by the processing device 110. The operations in the process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below may not be intended to be limiting. In some embodiments, the process 600 may be performed after the process 500 in FIG. 5 in response to a determination that the second resolution of the second target image generated in operation 510 in the process 500 in FIG. 5 does not meet the specific condition (e.g., the second resolution of the second target image is less than the resolution threshold).

In 602, the resolution increasing module 420 may generate a processed first target image and a processed second target image by increasing resolution of the first target image and the second target image.

The resolutions of the first target image and the second target image may be increased multiple times, such as 2 times, 3 times, 4 times, etc. The resolution-increasing times of the first target image and the second target image may be same or different. The resolution increasing module 420 may perform a non-uniform interpolation technique to increase the resolution of the first target image and the second target image. Exemplary non-uniform interpolation technique may include a bicubic interpolation, a nearest neighbor interpolation, a bilinear interpolation, an adaptive interpolation, or the like, or any combination thereof.

In 604, the feature point determination module 430 may determine second feature points of the target object based on the processed first target image and the processed second target image.

Merely by way of example, the feature point determination module 430 may generate a combined image by processing the processed first target image and the processed second target image using the SRCNN. The feature point determination module 430 may determine the second feature points of the target object in the combined image using the DCPN.

In 606, the priori information determination module 440 may determine second priori information of the target object based on the second feature points of the target object. The priori information determination module 440 may determine the second priori information by interpolating points to the second feature points of the target object using an interpolation algorithm. Exemplary interpolation algorithm may include a bicubic interpolation algorithm, a nearest neighbor interpolation algorithm, a bilinear interpolation algorithm, an adaptive interpolation algorithm, or the like, or any combination thereof.

In 608, the combination module 450 may generate a third target image having third resolution based on the second priori information, the processed first target image, and the processed second target image. The third resolution may be higher than the second resolution of the second target image.

In some embodiments, for each of one or more portions of the target object, the combination module 450 may determine at least one second local feature of the portion from the second priori information, the processed first target image, and the processed second target image. The second local feature of the portion of the target object may include detail information of the portion of the target object in the first target image and the second target image.

Merely by way of example, the combination module 450 may multiply the second priori information (e.g., the one or more masks) by the processed first target image and the processed second target image to determine at least one ROI in the processed first target image and the processed second target image. Each of the at least one ROI may include a portion (e.g., a nose, a mouth, eyes, ears, eyebrows, the face contour, etc.) of the target object. The combination module 450 may determine the at least one second local feature for each of the one or more portions of the target object by processing the at least one ROI in the processed first target image and the processed second target image using the HFBCNN.

The combination module 450 may determine at least one second high-frequency feature of the processed first target image and the processed second target image by processing the processed first target image and the processed second target image using, for example, the CBCNN.

The combination module 450 may determine a second high-frequency image based on the one or more second local features, the at least one second high-frequency feature, the processed first target image, and the processed second target image.

Merely by way of example, the combination module 450 may generate a second fusion image by combining the one or more second local features, the at least one second high-frequency feature, the processed first target image, and the processed second target image using the FCNN. The combination module 450 may generate a third processed fusion image by multiplying the one or more second local features by corresponding pixel values in the second fusion image. The combination module 450 may generate a fourth processed fusion image by multiplying the at least one second high-frequency feature by corresponding pixel values in the second fusion image. The combination module 450 may generate the second high-frequency image by adding pixel values in the third processed fusion image to corresponding pixel values in the fourth processed fusion image, respectively.

The combination module 450 may determine the third target image based on the processed second target image and the second high-frequency image. Merely by way of example, the combination module 450 may determine the third target image by adding pixel values in the processed second target image to corresponding pixel values in the second high-frequency image, respectively.

After executing 608, the combination module 450 may determine whether the third resolution meets the specific condition (e.g., the combination module 450 may determine whether the third resolution is greater than or equal to the resolution threshold). In response to a determination that the third resolution meets the specific condition (e.g., the third resolution is greater than or equal to the resolution threshold), the combination module 450 may output the third target image through, for example, the I/O 230 of the processing device 110. In response to a determination that the third resolution does not meet the specific condition (e.g., the third resolution is less than the resolution threshold), the processing device 110 may process the third target image to increase the third resolution. More details regarding increasing the third resolution may be found elsewhere in the present disclosure (e.g., the description in connection with FIG. 7).

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some steps may be reduced or added. However, those variations and modifications may not depart from the protecting of some embodiments of the present disclosure.

Figure 7:
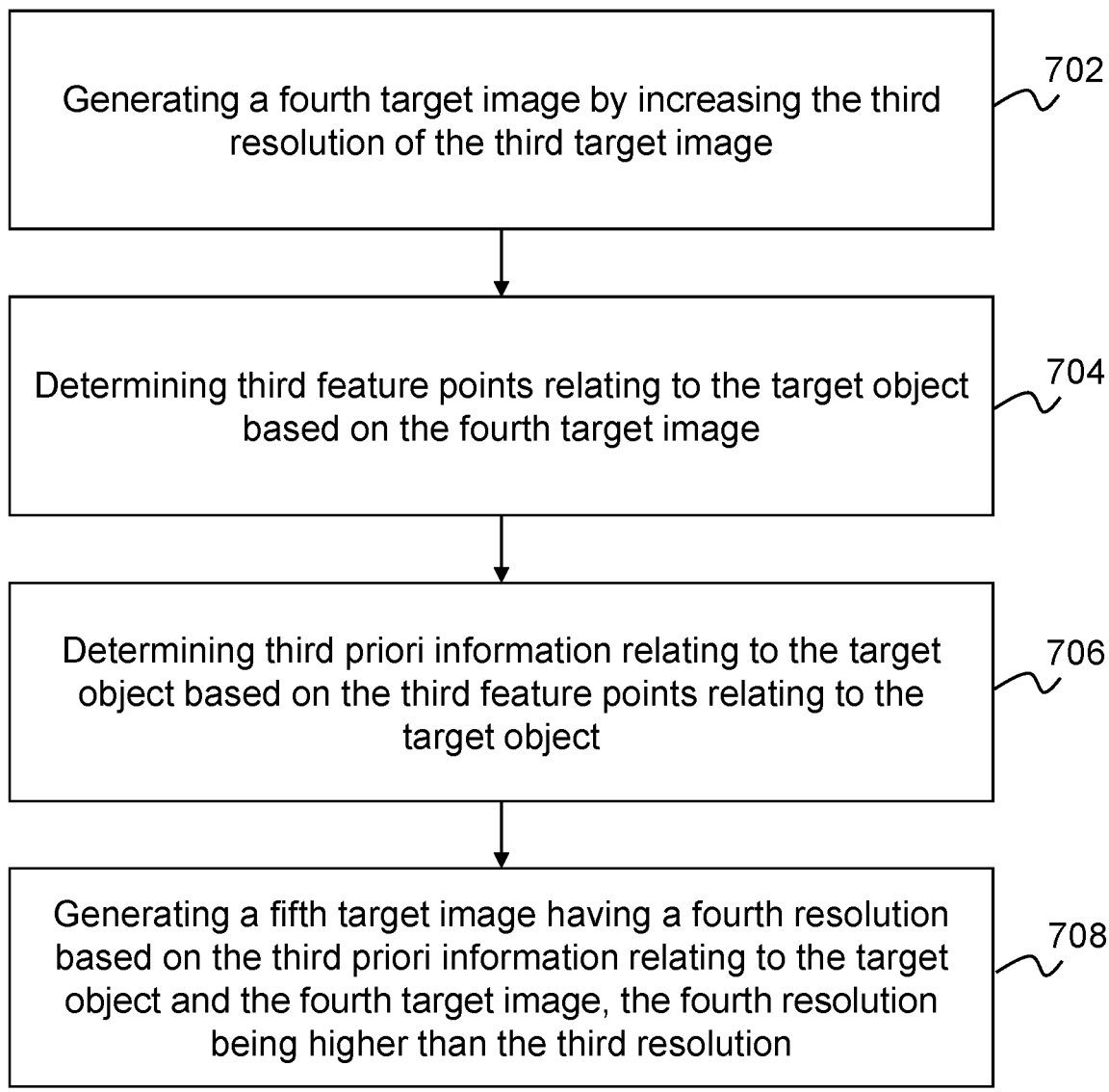
FIG. 7 is a flow chart illustrating an exemplary process for increasing image resolution according to some embodiments of the present disclosure.

FIG. 7 is a flow chart illustrating an exemplary process for increasing image resolution according to some embodiments of the present disclosure. In some embodiments, the process 700 may be implemented on the image processing system 100 as illustrated in FIG. 1. For example, the process 700 may be stored in a storage medium (e.g., the storage device 140, or the storage 220 of the processing device 110) as the form of instructions, and invoked and/or executed by the processing device 110. The operations in the process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below may not be intended to be limiting. In some embodiments, the process 700 may be performed after the process 600 in FIG. 6 in response to a determination that the third resolution of the third target image generated in operation 608 in the process 600 in FIG. 6 does not meet the specific condition (e.g., the third resolution is less than the resolution threshold).

In 702, the resolution increasing module 420 may generate a fourth target image by increasing the third resolution of the third target image. The number of times to increase the resolution of the third target image may be any value, such as 2 times, 3 times, 4 times, etc. The resolution increasing module 420 may perform a non-uniform interpolation technique to increase the third resolution of the third target image. Exemplary non-uniform interpolation technique may include a bicubic interpolation, a nearest neighbor interpolation, a bilinear interpolation, an adaptive interpolation, or the like, or any combination thereof.

In 704, the feature point determination module 430 may determine third feature points of the target object based on the fourth target image. Merely by way of example, the feature point determination module 430 may generate a fourth processed image by processing the fourth target image using the SRCNN. The feature point determination module 430 may determine the third feature points of the target object by processing the fourth processed image using the DCPN.

In 706, the priori information determination module 440 may determine third priori information of the target object based on the third feature points of the target object. The priori information determination module 440 may determine the third priori information by interpolating points to the third feature points of the target object using an interpolation algorithm. Exemplary interpolation algorithm may include a bicubic interpolation algorithm, a nearest neighbor interpolation algorithm, a bilinear interpolation algorithm, an adaptive interpolation algorithm, or the like, or any combination thereof.

In 708, the combination module 450 may generate a fifth target image having fourth resolution based on the third priori information of the target object and the fourth target image. The fourth resolution may be higher than the third resolution of the third target image.

Merely by way of example, the combination module 450 may multiply the third priori information (e.g., the one or more masks) by the fourth target image to determine at least one ROI in the fourth target image. Each of the at least one ROI may include a portion (e.g., a nose, a mouth, eyes, ears, eyebrows, the face contour, etc.) of the target object. The combination module 450 may determine the at least one third local feature for each of the one or more portions of the target object by processing the at least one ROI in the fourth target image using the HFBCNN. The combination module 450 may generate the fifth target image by adding the one or more third local features to corresponding pixel values in the fourth target image, respectively.

In some embodiments, the processing device 110 may increase the fourth resolution of the fifth target image using a process similar to the process 500, the process 600, or the process 700 in response to a determination that the fourth resolution does not meet the specific condition (e.g., the fourth resolution is less than the resolution threshold). Alternatively, the combination module 450 may output the fifth target image directly.

In some embodiments, in the processes 500-700, the combination module 450 may output the second target image, the third target image, or the fifth target image for further process, for example, enlarging a freeze frame and/or a specific area of a frame in a video to identify a car in a video surveillance system, improving of the resolution of the face of a suspect to recognize the suspect in a video surveillance system, or reconstructing high-resolution medical images based on several available low-resolution medical images in a medical imaging system.

It should be noted that the above description of process 400 is merely provided for the purposes of illustration, and not intended to be understood as the only embodiment. For persons having ordinary skills in the art, various variations and modifications may be conduct under the teaching of some embodiments of the present disclosure. In some embodiments, some steps may be reduced or added. However, those variations and modifications may not depart from the protecting of some embodiments of the present disclosure.

Figure 8:
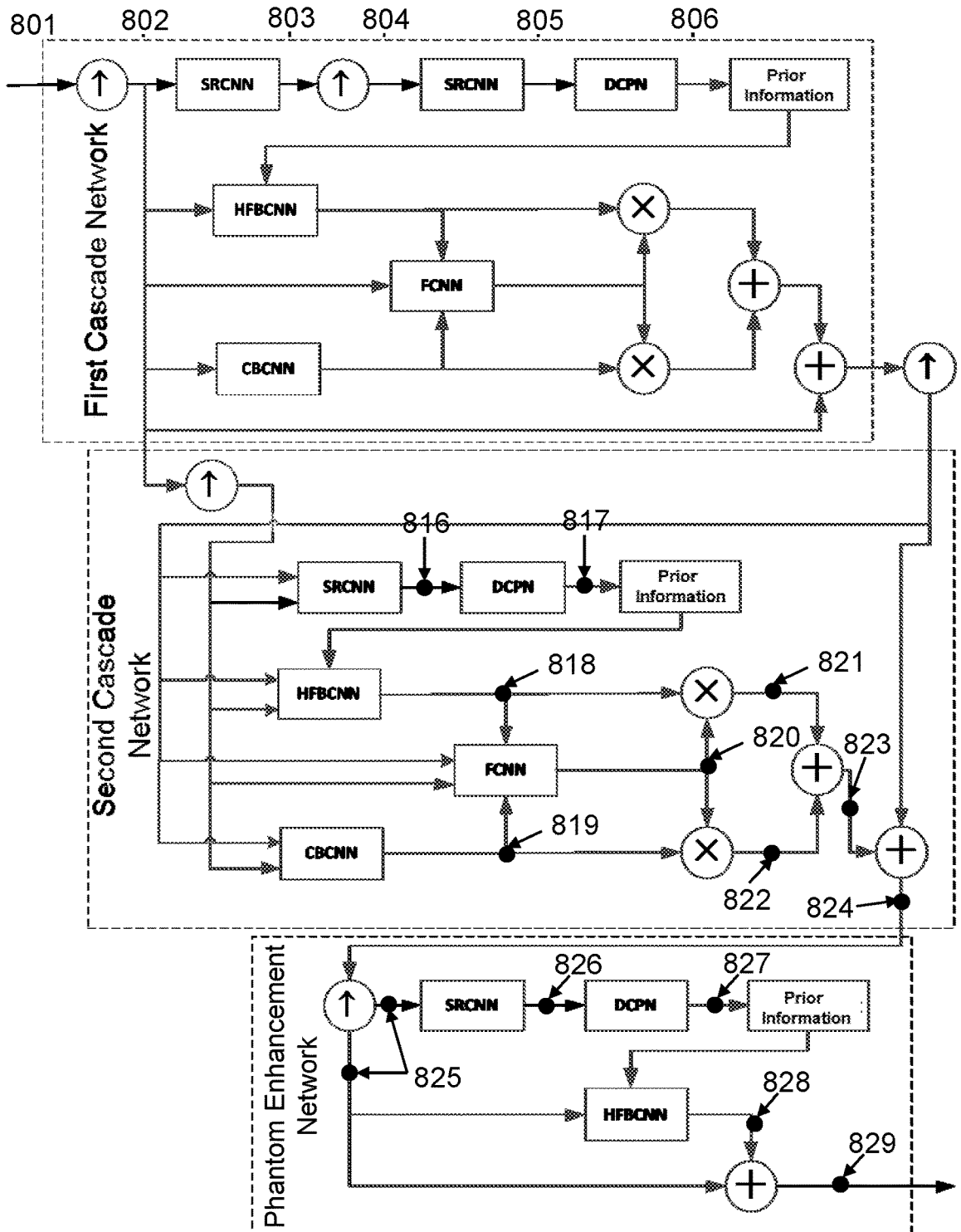
FIG. 8 is a schematic diagram illustrating an exemplary process for increasing image resolution according to some embodiments of the present disclosure.

FIG. 8 is a schematic diagram illustrating an exemplary process for increasing image resolution according to some embodiments of the present disclosure. As illustrated in FIG. 8, the processing device 110 may perform super-resolution image reconstruction based on the processes 500-700 using a super-resolution image reconstruction network. The super-resolution image reconstruction network includes a first cascade network, a second cascade network, and a phantom enhancement network.

The first cascade network may be configured to increase the first resolution of the original image and generate the second target image having the second resolution higher than the first resolution based on the process 500 in FIG. 5. The first cascade network may include the SRCNN, the DCPN, the HFBCNN, the FCNN, and the CBCNN. In the first cascade network, the obtaining module 410 may obtain the original image 801 that has the first resolution and includes the target object. The resolution increasing module 420 may generate the first target image 802 by increasing the first resolution of the original image 801 using the bicubic interpolation (represented by "↑" in FIG. 8). The feature point determination module 430 may generate the first processed image 803 by processing the first target image 802 using the SRCNN to increase the resolution of the first target image 802. The feature point determination module 430 may generate the second processed image 804 by increasing the resolution of the first processed image 803 using the bicubic interpolation. The feature point determination module 430 may generate the third processed image 805 by processing the second processed image 804 using the SRCNN to increase the resolution of the second processed image 804. The feature point determination module 430 may determine the first feature points 806 by processing the third processed image 805 using the DCPN. The priori information determination module 440 may determine the first priori information by interpolating points to the first feature points 806 of the target object using an interpolation algorithm. The combination module 450 may determine at least one first local feature 807 of each of the one or more portion of the target object from the first priori information and the first target image 802 using the HFBCNN. The combination module 450 may determine at least one first high-frequency feature 808 by processing the first target image 802 using the CBCNN. The combination module 450 may generate the first fusion image 809 by combining the one or more first local features 807, the at least one first high-frequency feature 808, and the first target image 802 using the FCNN. The combination module 450 may generate the first processed fusion image 810 by multiplying (represented by "×" in FIG. 8) the one or more first local features 807 by corresponding pixel values in the first fusion image 809. The combination module 450 may generate the second processed fusion image 811 by multiplying the at least one first high-frequency feature 808 by corresponding pixel values in the first fusion image 809. The combination module 450 may generate the first high-frequency image 812 by adding (represented by "+" in FIG. 8) pixel values in the first processed fusion image 810 to corresponding pixel values in the second processed fusion image 811, respectively. The combination module 450 may determine the second target image 813 by adding pixel values in the first target image 802 to corresponding pixel values in the first high-frequency image 812, respectively.

The second cascade network may be configured to increase the second resolution of the second target image and generate the third target image having the third resolution higher than the second resolution based on the process 600 in FIG. 6 in response to a determination that the second resolution does not meet the specific condition (e.g., the second resolution is less than the resolution threshold). The second cascade network may include the SRCNN, the DCPN, the HFBCNN, the FCNN, and the CBCNN. In the second cascade network, the resolution increasing module 420 may generate the processed first target image 814 and the processed second target image 815 by increasing the resolution of the first target image 802 and the second target image 813 using the bicubic interpolation. The feature point determination module 430 may generate the combined image 816 by processing the processed first target image 814 and the processed second target image 815 using the SRCNN. The feature point determination module 430 may determine the second feature points 817 of the target object by processing the combined image 816 using the DCPN. The priori information determination module 440 may determine the second priori information by interpolating points to the second feature points 817 of the target object using an interpolation algorithm. The combination module 450 may determine at least one second local feature 818 of each of the one or more portion of the target object from the second priori information, the processed first target image 814, and the processed second target image 815 using the HFBCNN. The combination module 450 may determine at least one second high-frequency feature 819 by processing the processed first target image 814 and the processed second target image 815 using the CBCNN. The combination module 450 may generate the second fusion image 820 by combining the one or more second local features 818, the at least one second high-frequency feature 819, the processed first target image 814, and the processed second target image 815 using the FCNN. The combination module 450 may generate the third processed fusion image 821 by multiplying the one or more second local features 818 by corresponding pixel values in the second fusion image 820. The combination module 450 may generate the fourth processed fusion image 822 by multiplying the at least one second high-frequency feature 819 by corresponding pixel values in the second fusion image 820. The combination module 450 may generate the second high-frequency image 823 by adding pixel values in the third processed fusion image 821 to corresponding pixel values in the fourth processed fusion image 822, respectively. The combination module 450 may determine the third target image 824 by adding pixel values in the processed second target image 815 to corresponding pixel values in the second high-frequency image 823, respectively.

The phantom enhancement network may be configured to increase the third resolution of the third target image and generate the fifth target image having the fourth resolution higher than the third resolution based on the process 700 in FIG. 7 in response to a determination that the third resolution does not meet the specific condition (e.g., the third resolution is less than the resolution threshold). The phantom enhancement network may include the SRCNN, the DCPN, and the HFBCNN. In the phantom enhancement network, the resolution increasing module 420 may generate the fourth target image 825 by increasing the third resolution of the third target image 824 using the bicubic interpolation. The feature point determination module 430 may generate the fourth processed image 826 by processing the fourth target image 825 using the SRCNN. The feature point determination module 430 may determine the third feature points 827 of the target object by processing the fourth processed image 826 using the DCPN. The priori information determination module 440 may determine the third priori information by interpolating points to the third feature points 827 relating to the target object using an interpolation algorithm. The combination module 450 may determine at least one third local feature 828 of each of the one or more portion of the target object from the third priori information and the fourth target image 825 using the HFBCNN. The combination module 450 may generate the fifth target image 829 by adding the one or more third local features 828 to corresponding pixel values in the fourth target image 825, respectively.

FIG. 9 is a schematic diagram illustrating an example of feature points according to some embodiments of the present disclosure. As illustrated in FIG. 9, points 902 represents feature points of an eye of a human face.

FIG. 10 is a schematic diagram illustrating an example of priori information according to some embodiments of the present disclosure. As illustrated in FIG. 10, the priori information includes 12 masks of different portions of a human face. Taking mask 1002 as an example, mask 1002 of a face contour of the human face. In mask 1002, values of pixels of the face contour are set as 1 (e.g., the white portion in mask 1002) and values of other pixels are set as 0 (e.g., the black portion in mask 1002).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system for super-resolution image reconstruction, comprising:
   at least one storage device including a set of instructions; and
   at least one processor in communication with the at least one storage device, wherein when executing the set of instructions, the at least one processor is directed to cause the system to:
      obtain an original image that has first resolution and includes a target object;
      generate a first target image by increasing the first resolution of the original image;
      determine first feature points relating to the target object based on the first target image;
      determine first priori information relating to the target object based on the first feature points relating to the target object, wherein the first priori information includes one or more masks each of which depicts one of one or more portions of the target object;
      extract the one or more portions of the target object by multiplying the first priori information by the first target image; and
      generate a second target image having second resolution higher than the first resolution based on the one or more portions of the target object and the first target image.

2. The system of claim 1, wherein to generate the second target image, the at least one processor is directed to cause the system to:
   for each of the one or more portions of the target object, determine at least one first local feature related to the portion based on the first priori information and the first target image;
   determine at least one first high-frequency feature relating to the target object based on the first target image;
   generate a first high-frequency image based on the one or more first local features, the at least one first high-frequency feature, and the first target image; and
   generate the second target image based on the first target image and the first high-frequency image.

3. The system of claim 1, further comprising a camera to take the original image and send the original image to the at least one processor.

4. The system of claim 1, wherein to obtain the original image, the at least one processor is further directed to cause the system to:
  obtain an image that includes the target object; and
  generate the original image by identifying the target object in the image to be processed.

5. The system of claim 1, wherein to determine the first priori information relating to the target object, the processor is further directed to cause the system to:
  interpolate points to the first feature points relating to the target object.

6. The system of claim 1, wherein when executing the set of instructions, the at least one processor is further directed to cause the system to:
  determine whether the second resolution is greater than or equal to a resolution threshold;
  in response to a determination that the second resolution is less than the resolution threshold:
    obtain a processed first target image by increasing resolution of the first target image, and
    obtain a processed second target image by increasing the second resolution;
  obtain a combined image by combining the processed first target image and the processed second target image;
  determine second feature points relating to the target object based on the combined image;
  determine second priori information relating to the target object based on the second feature points relating to the target object; and
  generate a third target image having third resolution higher than the second resolution based on the second priori information relating to the target object, the processed first target image, and the processed second target image.

7. The system of claim 6, wherein to generate the third target image, the at least one processor is further directed to cause the system to:
  for each of the one or more portions of the target object, determine at least one second local feature related to the portion based on the second priori information, the processed first target image, and the processed second target image;
  determine at least one second high-frequency feature relating to the target object based on the processed first target image and the processed second target image; and
  determine the third target image based on the one or more second local features, the at least one second high-frequency features, the processed first target image, and the processed second target image.

8. The system of claim 6, wherein when executing the set of instructions, the at least one processor is further directed to cause the system to:
  determine whether the third resolution is greater than or equal to the resolution threshold;
  in response to a determination that the third resolution is less than the resolution threshold, obtain a fourth target image by increasing the third resolution;
  determine third feature points relating to the target object based on the fourth target image;
  determine third priori information relating to the target object based on the third feature points relating to the target object; and
  generate a fifth target image having fourth resolution based on the third priori information relating to the target object and the fourth target image, the fourth resolution being higher than the third resolution.

9. The system of claim 8, wherein to generate the fifth target image having the fourth resolution, the at least one processor is further directed to cause the system to:
  for each of the one or more portions of the target object, determine at least one third local feature related to the portion based on the third priori information and the fourth target image; and
  generate the fifth target image based on the one or more third local features and the fourth target image.

10. The system of claim 1, wherein the target object includes one or more faces.

11. A method for super-resolution image reconstruction implemented on a computing device having one or more processors and one or more storage devices, the method comprising:
  obtaining an original image that has first resolution and includes a target object;
  generating a first target image by increasing the first resolution of the original image;
  determining first feature points relating to the target object based on the first target image;
  determining first priori information relating to the target object based on the first feature points relating to the target object, wherein the first priori information includes one or more masks each of which depicts one of one or more portions of the target object;
  extracting the one or more portions of the target object by multiplying the first priori information by the first target image; and
  generating a second target image having second resolution higher than the first resolution based on the one or more portions of the target object and the first target image.

12. The method of claim 11, wherein the generating of the second target image includes:
  for each of the one or more portions of the target object, determining at least one first local feature related to the portion based on the first priori information and the first target image;
  determining at least one first high-frequency feature relating to the target object based on the first target image;
  generating a first high-frequency image based on the one or more first local features, the at least one first high-frequency feature, and the first target image; and
  generating the second target image based on the first target image and the first high-frequency image.

13. The method of claim 11, wherein the original image is taken by a camera.

14. The method of claim 11, wherein the obtaining of the original image includes:
  obtaining an image that includes the target object; and
  generating the original image by identifying the target object in the image to be processed.

15. The method of claim 11, wherein the determining of the first priori information relating to the target object includes:
  interpolating points to the first feature points relating to the target object.

16. The method of claim 11, further comprising:
determining whether the second resolution is greater than or equal to a resolution threshold;
in response to a determination that the second resolution is less than the resolution threshold:
  obtaining a processed first target image by increasing resolution of the first target image, and
  obtaining a processed second target image by increasing the second resolution;
obtaining a combined image by combining the processed first target image and the processed second target image;
determining second feature points relating to the target object based on the combined image;
determining second priori information relating to the target object based on the second feature points relating to the target object; and
generating a third target image having third resolution higher than the second resolution based on the second priori information relating to the target object, the processed first target image, and the processed second target image.

17. The method of claim 16, wherein the generating of the third target image includes:
for each of the one or more portions of the target object, determining at least one second local feature related to the portion based on the second priori information, the processed first target image, and the processed second target image;
determining at least one second high-frequency feature relating to the target object based on the processed first target image and the processed second target image; and
determining the third target image based on the one or more second local features, the at least one second high-frequency features, the processed first target image, and the processed second target image.

18. The method of claim 16, further comprising:
determining whether the third resolution is greater than or equal to the resolution threshold;
in response to a determination that the third resolution is less than the resolution threshold, obtaining a fourth target image by increasing the third resolution;
determining third feature points relating to the target object based on the fourth target image;
determining third priori information relating to the target object based on the third feature points relating to the target object; and
generating a fifth target image having fourth resolution based on the third priori information relating to the target object and the fourth target image, the fourth resolution being higher than the third resolution.

19. The method of claim 18, wherein the generating of the fifth target image having the fourth resolution includes:
for each of the one or more portions of the target object, determining at least one third local feature related to the portion based on the third priori information and the fourth target image; and
generating the fifth target image based on the one or more third local features and the fourth target image.

20. A non-transitory computer readable medium, comprising at least one set of instructions for super-resolution image reconstruction, wherein when executed by one or more processors of a computing device, the at least one set of instructions causes the computing device to perform a method, the method comprising:
obtaining an original image that has first resolution and includes a target object;
generating a first target image by increasing the first resolution of the original image;
determining first feature points relating to the target object based on the first target image;
determining first priori information relating to the target object based on the first feature points relating to the target object, wherein the first priori information includes one or more masks each of which depicts one of one or more portions of the target object;
extracting the one or more portions of the target object by multiplying the first priori information by the first target image; and
generating a second target image having second resolution higher than the first resolution based on the one or more portions of the target object and the first target image.

* * * * *